(12) United States Patent
Takatani et al.

(10) Patent No.: US 7,233,483 B2
(45) Date of Patent: Jun. 19, 2007

(54) SOLID ELECTROLYTIC CAPACITOR

(75) Inventors: Kazuhiro Takatani, Osaka (JP); Takahisa Iida, Osaka (JP); Mamoru Kimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/370,889

(22) Filed: Mar. 9, 2006

(65) Prior Publication Data

US 2006/0209496 A1 Sep. 21, 2006

(30) Foreign Application Priority Data

Mar. 17, 2005 (JP) ............................. 2005-076311

(51) Int. Cl.
*H01G 9/00* (2006.01)
(52) U.S. Cl. .................. 361/523; 361/525; 361/528; 361/529; 361/534; 29/25.03
(58) Field of Classification Search .............. 361/502, 361/523–525, 528–534, 516–519, 508–512; 29/25.03, 25.01
See application file for complete search history.

(56) References Cited

U.S. PATENT DOCUMENTS

| | | | | |
|---|---|---|---|---|
| 4,159,509 | A | * | 6/1979 | Walters ..................... 361/507 |
| 6,515,848 | B1 | * | 2/2003 | Yoshida et al. ............. 361/525 |
| 6,529,366 | B2 | * | 3/2003 | Nakamura ................... 361/523 |
| 6,594,141 | B2 | * | 7/2003 | Takada ....................... 361/523 |
| 6,906,912 | B2 | * | 6/2005 | Arai et al. .................. 361/525 |
| 6,934,146 | B2 | * | 8/2005 | Omori et al. ............... 361/501 |
| 6,956,732 | B1 | * | 10/2005 | Yano et al. .................. 361/524 |
| 6,999,303 | B2 | * | 2/2006 | Hasegawa ................... 361/525 |

FOREIGN PATENT DOCUMENTS

| | | |
|---|---|---|
| JP | 3-46215 | 2/1991 |
| JP | 6-151261 | 5/1994 |

* cited by examiner

*Primary Examiner*—Nguyen T. Ha
(74) *Attorney, Agent, or Firm*—Westerman, Hattori, Daniels & Adrian , LLP.

(57) ABSTRACT

A solid electrolytic capacitor having an anode of valve metals or of an alloy of which main component is valve metals; a dielectric layer formed by anodizing said anode; an electrolyte layer formed on said dielectric layer; and a cathode formed on said electrolyte layer; wherein said cathode has a silver layer using silver and sulfur and/or sulfur compound is contained in said silver layer.

7 Claims, 1 Drawing Sheet

4 2　4 1　3　1　2
　　4

4 2　3　1　2
(4)

SOLID ELECTROLYTIC CAPACITOR

RELATED APPLICATION

The priority application number Japanese Patent Application 2005-76311 upon which this application is based is hereby incorporated by reference.

BACKGROUND OF THE INVENTION

1. Field of the Invention

The present invention relates to a solid electrolytic capacitor, the solid electrolytic capacitor comprising an anode of valve metals or of an alloy of which main component is valve metals, a dielectric layer formed by anodizing said anode, an electrolyte layer formed on said dielectric layer, and a cathode formed on said electrolyte layer. Particularly, the invention relates to a solid electrolytic capacitor wherein a silver layer using silver is formed for said cathode.

2. Description of the Related Art

In recent years, solid electrolytic capacitors have been widely used for a variety of electronic equipments.

Generally, it has been known such a solid electrolytic capacitor fabricated by: anodizing an anode of valve metals, such as tantalum, aluminum, niobium and titanium, or of an alloy thereof to form a dielectric layer of the oxide on the anode surface; overlaying an electrolyte layer using a conductive polymer or manganese dioxide and the like on the dielectric layer; and overlaying a carbon layer using a carbon and a silver layer using silver as a cathode on the electrolyte layer. (See, for example, Japanese Published Unexamined Patent Application No. 3-46215.)

However, a problem of the above-described solid electrolytic capacitor has been that, particularly, under a high temperature and high humidity environment, silver contained in the silver layer of the cathode is dissolved and ionized, causing migration of silver of re-deposit of silver on the anode surface, which results in occurrence of short circuit and increase of leakage current.

Therefore, in recent years, it has been proposed to prevent migration of silver contained in a silver layer by adding boron simplex powder or boron intermetallic compound powder to the silver layer. (See, for example, Japanese Published Unexamined Patent Application No. 6-151261.)

Nevertheless, the above-described solid electrolytic capacitor still has a problem that it is impossible to fully prevent migration of silver contained in the silver layer even in the case of adding boron simplex powder or boron intermetallic compound powder to the silver layer, therefore, it still causes occurrence of short circuit and increase of leakage current under a high temperature and high humidity environment.

SUMMARY OF THE INVENTION

It is an object of the present invention, in a solid electrolytic capacitor forming a silver layer using silver for a cathode, to prevent migration of silver of re-deposition of silver on the anode surface by dissolution and ionization of silver contained in the silver layer for the cathode.

Another object of the present invention is to fully prevent increase of leakage current resulting from short circuit under a high temperature and high humidity environment.

According to the invention, a solid electrolytic capacitor comprising: an anode of valve metals or of an alloy of which main component is valve metals; a dielectric layer formed by anodizing said anode; an electrolyte layer formed on said dielectric layer; and a cathode formed on said electrolyte layer; wherein said cathode comprises a silver layer using silver and sulfur and/or sulfur compound is contained in said silver layer.

It is preferable that at least one type selected from bis(3-sulfopropyl)disulfide, 3-mercapto-1-propanesulfonate, and 2-mercapto-ethylsulfido is used for sulfur compound contained in said silver layer.

It is preferable that the amount of sulfur contained in the silver layer is to be within the range from 0.01 to 0.5 wt % with respect to the total amount of silver and sulfur and/or sulfur compound in the case that sulfur and/or sulfur compound is contained in the silver layer.

In the solid electrolytic capacitor of the present invention, because sulfur and/or sulfur compound is contained in the silver layer of the cathode, silver in the silver layer combines with sulfur or sulfur compound, so that ionization of silver is prevented and migration of silver is prevented even under a high temperature and high humidity environment.

As a consequence, according to the present invention, it is possible to obtain a solid electrolytic capacitor wherein occurrence of short circuit resulting from migration of silver is prevented and leakage current is reduced.

When sulfur compound selected from bis(3-sulfopropyl) disulfide, 3-mercapto-1-propanesulfonate, and 2-mercapto-ethylsulfido is used as the sulfur compound contained in the silver layer, sulfur in the sulfur compound combines with silver in the silver layer, ionization of silver is easily prevented, so that migration of silver is more prevented even under a high temperature and high humidity environment as compared with using other sulfur compound.

In the solid electrolytic capacitor of the present invention, if the amount of sulfur contained in the silver layer is small, because an effect of preventing migration of silver is small under a high temperature and high humidity environment, it becomes difficult to fully prevent increase of leakage current. On the other hand, if the amount of sulfur contained in the silver layer is large, conductivity of the silver layer is lowered, so that equivalent series resistance becomes high.

Therefore, in the solid electrolytic capacitor of the present invention, it is preferable that the amount of sulfur contained in the silver layer is within the range of 0.01 to 0.5 wt % with respect to the total amount of silver and sulfur and/or sulfur compound. In such a case, migration of silver is prevented even under a high temperature and high humidity environment, then, in addition to prevention of increase of leakage current, increase of equivalent series resistance of the solid electrolytic capacitor is prevented. Especially, it is preferable that the amount of sulfur contained in the silver layer is within the range from 0.05 to 0.3 wt % with respect to the total amount of silver and sulfur and/or sulfur compound.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Hereinbelow, solid electrolytic capacitors according to embodiments of the invention are specifically described with reference to the accompanying drawings. It is to be noted that the solid electrolytic capacitors of the invention should not be limited to the following embodiments thereof and suitable changes and modifications may be made thereto within the scope of the invention.

Figure 1:
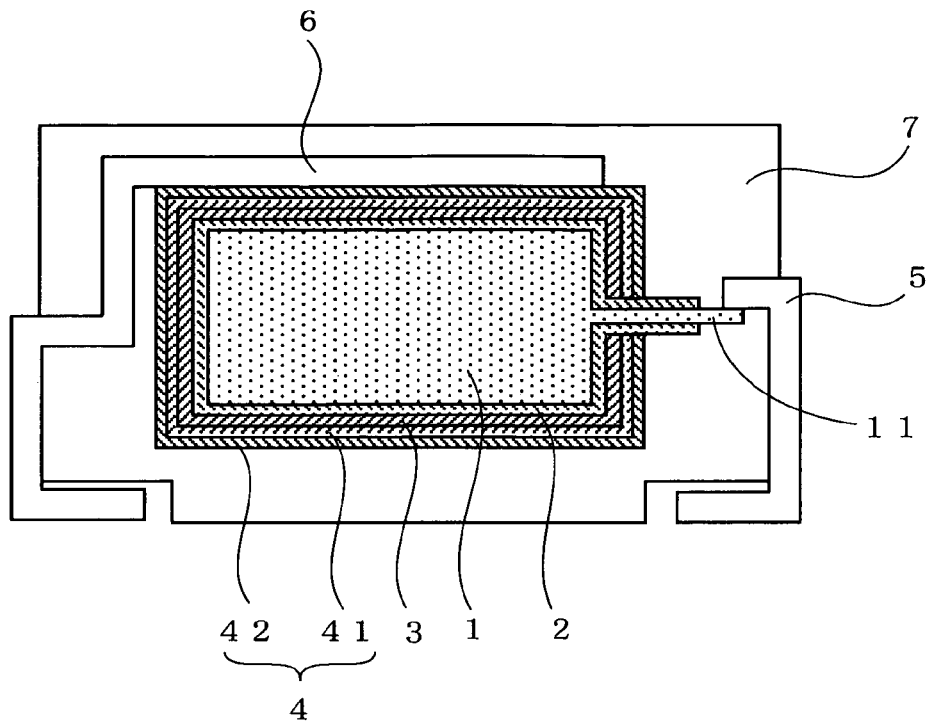
FIG. 1 is a sectional view illustrating a solid electrolytic capacitor according to an embodiment of the present invention.

In a solid electrolytic capacitor of an embodiment of the invention, as shown in FIG. 1, an anode 1 composed of valve metals, such as, tantalum, aluminum, niobium and titanium, or of an alloy of which main component is such valve metals is used and a lead 11 is led out of the anode 1.

The anode 1 is anodized in an aqueous electrolyte to form a dielectric layer 2 on the surface of the anode 1. Further, an electrolyte layer 3 is formed to cover the surface of the dielectric layer 2. Examples of materials used for the electrolyte layer include conducting polymer materials, such as polypyrrole, polythiophene or polyaniline, or conducting oxides, such as manganese dioxide.

Then, a cathode 4 to cover the surface of the electrolyte layer 3 is formed as follows. A carbon layer 41 using carbon paste is formed on the electrolyte layer 3 and a silver layer 42 using silver paste containing sulfur and/or sulfur compound is formed on the carbon layer 41.

In the solid electrolytic capacitor according to the embodiment, an anode lead 5 is connected to the lead 11 led out of the anode 1, a cathode lead 6 is connected to the silver layer 42 of the cathode 4, and the solid electrolytic capacitor is encapsulated with a resin layer 7 of an insulating resin, such as epoxy resin, to thrust the anode lead 5 and the cathode lead 6 outside.

Figure 2:
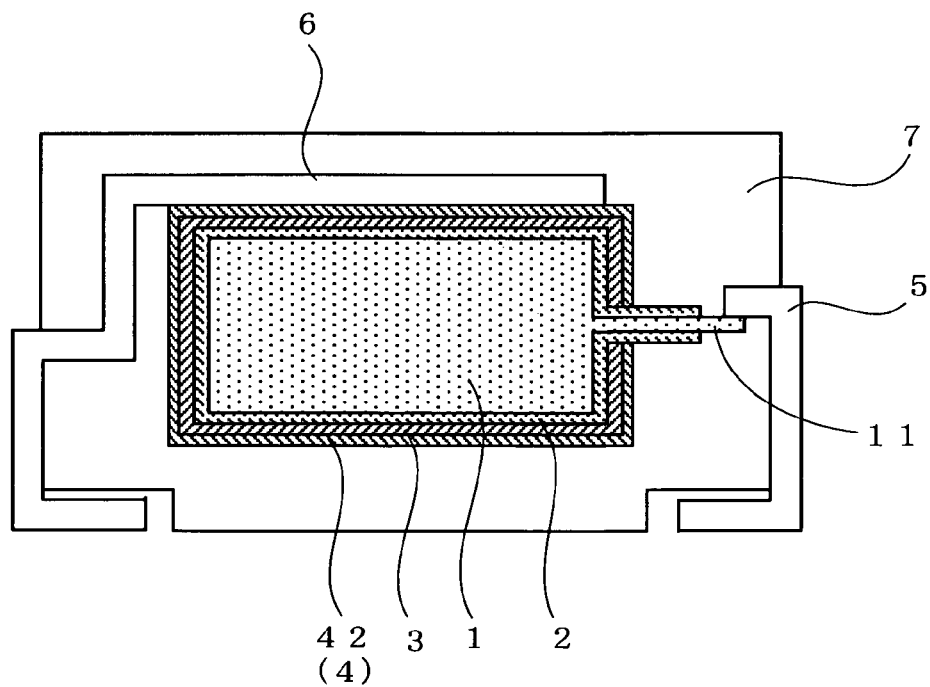
FIG. 2 is a sectional view illustrating a solid electrolytic capacitor without forming a carbon layer for a cathode according to another embodiment of the present invention.

In the solid electrolyte capacitor of an embodiment shown in FIG. 1, the carbon layer 41 using carbon and the silver layer 42 containing sulfur and/or sulfur compound are deposited as the cathode 4, however, it is possible to provide only the silver layer 42 containing sulfur and/or sulfur compound without forming the above mentioned carbon layer 41 to cover the surface of the electrolyte layer 3 as shown in FIG. 2.

Hereinbelow, solid electrolytic capacitors according to examples of the invention are specifically described, and it will be demonstrated by the comparison with comparative examples that increase of leakage current of the inventive solid electrolytic capacitors of Examples is prevented even under a high temperature and high humidity environment. It is to be noted that the solid electrolytic capacitors of the invention should not be limited to the following examples thereof and suitable changes and modifications may be made thereto within the scope of the invention.

EXAMPLE 1

In a solid electrolytic capacitor of Example 1, a sintered body of tantalum was used for an anode 1 and a lead 11 was led out of the anode 1.

The anode 1 was anodized for 10 hours in 0.5 wt % phosphoric acid solution having a temperature of 50° C. to form a dielectric layer 2 of the tantalum oxide on the surface of the anode 1. Then, an electrolyte layer 3 of polypyrrole was formed on the dielectric layer 2 by polymerization.

Next, in forming a cathode 4 on the electrolyte layer 3, carbon paste was applied on the electrolyte layer 3 and dried for 30 minutes at a temperature of 150° C. to form a carbon layer 41, and a silver layer 42 was formed on the carbon layer 41.

In forming the silver layer 42, in order to prepare a silver paste, 80 parts by weight of a mixture wherein silver particles and bis(3-sulfopropyl)disulfide were mixed at a weight ratio of 99.72:0.28, was mixed with 10 parts by weight of phenol resin as a binder, and 10 parts by weight of methyl carbitol as a solvent. In the silver paste, the amount of sulfur was 0.05 wt % with respect to the total amount of silver particles and bis(3-sulfopropyl)disulfide.

Next, the silver paste was applied on the carbon layer 41 and dried for 30 minutes at a temperature of 150° C. to form the silver layer 42.

Then, the solid electrolytic capacitor as shown in FIG. 1 was fabricated as follows. An anode lead 5 was connected to the lead 11 led out of the anode 1, a cathode lead 6 was connected to the silver layer 42 of the cathode 4, and the solid electrolytic capacitor was encapsulated with a resin layer 7 of epoxy resin, to thrust the anode lead 5 and the cathode lead 6 outside.

EXAMPLE 2

The same procedure as in Example 1 was used to fabricate a solid electrolytic capacitor of Example 2, except that a mixture of silver particles and sulfur mixed at a weight ratio of 99.95:0.05 (wherein the amount of sulfur with respect to total amount of silver particles and sulfur was 0.05 wt %) was used for forming the silver layer 42 of Example 1, instead of the mixture wherein silver particles were mixed with bis(3-sulfopropyl)disulfide at a weight ratio of 99.72:0.28.

EXAMPLES 3 TO 5

The same procedure as in Example 1 was used to fabricate each of solid electrolytic capacitors of Examples 3 to 5, except that a mixture of silver particles and 3-mercapto-1-propanesulfonate mixed at a weight ratio of 99.72:0.28 in Example 3, a mixture of silver particles and 2-mercapto-ethylsulfido mixed at a weight ratio of 99.72:0.28 in Example 4, a mixture of silver particles and diphenyl disulfide mixed at a weight ratio of 99.71:0.29 in Example 5, was used for forming the silver layer 42 of Example 1, instead of the mixture wherein silver particles were mixed with bis(3-sulfopropyl)disulfide at a weight ratio of 99.72:0.28. In each of the solid electrolytic capacitors of Examples 3 to 5, the amount of sulfur with respect to the total amount of silver particles and the above mentioned sulfur compound was 0.05 wt %.

EXAMPLE 6

In Example 6, the same procedure as in Example 1 was used to fabricate a solid electrolytic capacitor shown in FIG. 2, except that the same silver layer 42 as Example 1 was formed directly on the electrolyte layer 3 without forming the carbon layer 41.

COMPARATIVE EXAMPLE 1

The same procedure as in Example 1 was used to fabricate a solid electrolytic capacitor of Comparative Example 1, except that a mixture of silver particles and boron mixed at a weight ratio of 98:2 was used for forming the silver layer 42 of Example 1, instead of the mixture wherein silver particles were mixed with bis(3-sulfopropyl)disulfide at a weight ratio of 99.72:0.28. In the mixture of silver particles and boron, the amount of boron with respect to the total amount of silver particles and boron was 2.0 wt %.

COMPARATIVE EXAMPLE 2

The same procedure as in Example 1 was used to fabricate a solid electrolytic capacitor of Comparative Example 2, except that bis(3-sulfopropyl)disulfide was not added to silver particles and only silver particles was used for forming the silver layer 42 of Example 1.

Then, a voltage of 2 V was applied to each of the solid electrolytic capacitors fabricated of Examples 1 to 6 and Comparative Examples 1 and 2 under a high temperature and high humidity environment of 85° C. and 85% RH to measure leakage current at an initial stage and after 1000 hours. The results were shown in Table 1 below.

TABLE 1

| | | LEAKAGE CURRENT (μA) | |
|---|---|---|---|
| | ADDITIVE TO SILVER LAYER | AT INITIAL STAGE | AFTER 1000 HOURS |
| EXAMPLE 1 | bis(3-sulfopropyl)disulfide | 120 | 122 |
| EXAMPLE 2 | sulfur | 120 | 123 |
| EXAMPLE 3 | 3-mercapto-1-propanesulfonate | 120 | 123 |
| EXAMPLE 4 | 2-mercapto-ethylsulfido | 121 | 123 |
| EXAMPLE 5 | diphenyl disulfide | 122 | 135 |
| EXAMPLE 6 | bis(3-sulfopropyl)disulfide | 121 | 123 |
| COMPARATIVE EXAMPLE 1 | boron | 125 | 580 |
| COMPARATIVE EXAMPLE 2 | — | 125 | 960 |

As a consequence, in each of the solid electrolytic capacitors of Examples 1 to 6 wherein sulfur or sulfur compound was contained in the silver layer of the cathode, leakage current after 1000 hours was remarkably reduced as compared with the solid electrolytic capacitor of Comparative Example 1 wherein boron was contained in the silver layer and the solid electrolytic capacitor of Comparative Example 2 wherein nothing was contained in the silver layer. That is to say, increase of leakage current under a high temperature and high humidity environment was prevented in each of the solid electrolytic capacitors of Examples 1 to 6.

In a comparison among Examples 1 to 6, in the solid electrolytic capacitors of Examples 1 to 4 and 6 wherein bis(3-sulfopropyl)disulfide, 3-mercapto-1-propanesulfonate or 2-mercapto-ethylsulfido was contained in the silver layer as sulfur or sulfur compound, leakage current after 1000 hours was more reduced and increase of leakage current under a high temperature and high humidity environment was more prevented.

EXAMPLES 1.1 TO 1.8

The same procedure as in Example 1 was used to fabricate each solid electrolytic capacitor of Examples 1.1 to 1.8, except that the amount of sulfur with respect to the total amount of silver particles and bis(3-sulfopropyl)disulfide was changed by changing the weight ratio of mixing silver particles and bis(3-sulfopropyl)disulfide for forming the silver layer 42 of Example 1.

Each weight ratio of silver particles and bis(3-sulfopropyl)disulfide and each amount of sulfur was set as follows: 99.994:0.006 and 0.001 wt % in Example 1.1, 99.972:0.028 and 0.005 wt % in Example 1.2, 99.944:0.056 and 0.01 wt % in Example 1.3, 99.44:0.56 and 0.1 wt % in Example 1.4, 98.33:1.67 and 0.3 wt % in Example 1.5, 97.22:2.78 and 0.5 wt % in Example 1.6, 96.11:3.89 and 0.7 wt % in Example 1.7, and 94.44:5.56 and 1.0 wt % in Example 1.8.

Next, the same as Example 1, the voltage of 2 V was applied to each of the solid electrolytic capacitors of Example 1.1 to 1.8 under the high temperature and high humidity environment of 85° C. and 85% RH, and leakage current at an initial stage and after 1000 hours was measured and also, equivalent series resistance (ESR) at an initial stage and after 1000 hours was determined by means of an LCR meter at a frequency of 100 kHz. The results were shown together with that of Example 1 in Table 2 below.

TABLE 2

| | | LEAKAGE CURRENT(μA) | | ESR(mΩ) | |
|---|---|---|---|---|---|
| | AMOUNT OF SULFUR (wt %) | AT INITIAL STAGE | AFTER 1000 HOURS | AT INITIAL STAGE | AFTER 1000 HOURS |
| EXAMPLE 1.1 | 0.001 | 120 | 183 | 18 | 18 |
| EXAMPLE 1.2 | 0.005 | 120 | 138 | 18 | 18 |
| EXAMPLE 1.3 | 0.01 | 120 | 126 | 19 | 19 |
| EXAMPLE 1 | 0.05 | 120 | 122 | 19 | 19 |
| EXAMPLE 1.4 | 0.1 | 120 | 122 | 19 | 19 |
| EXAMPLE 1.5 | 0.3 | 120 | 120 | 20 | 20 |
| EXAMPLE 1.6 | 0.5 | 120 | 120 | 22 | 22 |
| EXAMPLE 1.7 | 0.7 | 120 | 120 | 26 | 27 |
| EXAMPLE 1.8 | 1.0 | 120 | 120 | 33 | 34 |

As apparent from the table, in each of the solid electrolytic capacitors of Examples 1.3 to 1.6 and 1, wherein the amount of sulfur with respect to the total amount of silver particles and bis(3-sulfopropyl)disulfide was within the range from 0.01 wt % to 0.5 wt %, increase of leakage current after 1000 hours was small as compared with the solid electrolytic capacitors of Examples 1.1 and 1.2, wherein the amount of sulfur with respect to the total amount of silver particles and bis(3-sulfopropyl)disulfide was less than 0.01 wt %. Further, in each of the solid electrolytic capacitors of Examples 1.3 to 1.6 and 1, equivalent series resistance (ESR) was low as compared with the solid electrolytic capacitors of Examples 1.7 and 1.8, wherein the amount of sulfur with respect to the total amount of silver particles and bis(3-sulfopropyl)disulfide was more than 0.5 wt %. Especially, in each of the solid electrolytic capacitors of Examples 1, 1.4 and 1.5 wherein the amount of sulfur with respect to the total amount of silver particles and bis(3-sulfopropyl)disulfide was within the range from 0.05 wt % to 0.3 wt %, increase of leakage current after 1000 hours was fully prevented and equivalent series resistance (ESR) was remarkably lowered.

Although tantalum was used for the anode of each of Examples mentioned above, even when other valve metals, such as, aluminum, niobium or titanium, or an alloy of which major component is those metals is used, the same results can be obtained.

Although the present invention has been fully described by way of examples, it is to be noted that various changes and modifications will be apparent to those skilled in the art.

Therefore, unless otherwise such changes and modifications depart from the scope of the invention, they should be construed as being included therein.

The invention claimed is:

1. A solid electrolytic capacitor comprising: an anode of valve metals or of an alloy of which main component is valve metals; a dielectric layer formed by anodizing said anode; an electrolyte layer formed on said dielectric layer; and a cathode formed on said electrolyte layer;
wherein said cathode comprises a silver layer, said silver layer comprising silver and one or both of sulfur and a sulfur compound.

2. The solid electrolytic capacitor according to claim 1, wherein sulfur is contained in the silver layer.

3. The solid electrolytic capacitor according to claim 1, wherein sulfur compound contained in the silver layer is at least one type selected from bis(3-sulfopropyl)disulfide, 3-mercapto-1-propanesulfonate, and 2-mercapto-ethylsulfido.

4. The solid electrolytic capacitor according to claim 1, wherein the amount of sulfur contained in the silver layer is within the range from 0.001 to 1.0 wt % with respect to the total amount of silvers, sulfur and sulfur compound.

5. The solid electrolytic capacitor according to claim 4, wherein the amount of sulfur contained in the silver layer is within the range from 0.01 to 0.5 wt % with respect to the total amount of silvers, sulfur and sulfur compound.

6. The solid electrolytic capacitor according to claim 4, wherein the amount of sulfur contained in the silver layer is within the range from 0.05 to 0.3 wt % with respect to the total amount of silver, sulfur and sulfur compound.

7. The solid electrolytic capacitor according to claim 1, wherein the cathode comprises a carbon layer formed on the electrolyte layer, and the silver layer is deposited on the carbon layer.

* * * * *